(12) United States Patent
Johnson et al.

(10) Patent No.: US 12,544,837 B2
(45) Date of Patent: Feb. 10, 2026

(54) COATED CUTTING TOOL (71) Applicant: AB SANDVIK COROMANT, Sandviken (SE)

(72) Inventors: Lars Johnson, Stockholm (SE); Marta Saraiva, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 909 days.

(21) Appl. No.: 17/619,315

(22) PCT Filed: Jun. 17, 2020

(86) PCT No.: PCT/EP2020/066791
§ 371 (c)(1),
(2) Date: Dec. 15, 2021

(87) PCT Pub. No.: WO2020/254424
PCT Pub. Date: Dec. 24, 2020

(65) Prior Publication Data
US 2022/0297197 A1    Sep. 22, 2022

(30) Foreign Application Priority Data

Jun. 19, 2019 (EP) ...................................... 19181101

(51) Int. Cl.
*B23B 27/14* (2006.01)
*C23C 14/06* (2006.01)
(Continued)

(52) U.S. Cl.
CPC .......... *B23B 27/14* (2013.01); *C23C 14/0641* (2013.01); *C23C 14/16* (2013.01);
(Continued)

(58) Field of Classification Search
None
See application file for complete search history.

(56) References Cited

U.S. PATENT DOCUMENTS

| 2014/0272391 | A1  | 9/2014  | Kumar et al. |
| 2015/0050489 | A1* | 2/2015  | Kumar ................ C23C 14/0641 |
|              |     |         | 428/336 |
| 2017/0312830 | A1* | 11/2017 | Asanuma ................ C23C 28/44 |

FOREIGN PATENT DOCUMENTS

| CN | 104441814 A | 2/2017 |
| EP | 3441168 A1  | 2/2019 |

(Continued)

*Primary Examiner* — Shawn Mckinnon
(74) *Attorney, Agent, or Firm* — Corinne R. Gorski (57) ABSTRACT

A coated cutting tool includes a substrate and a coating, wherein the coating has a (Ti,Al)N multilayer of alternating cubic $Ti_{1-x}Al_xN$ sub-layers, $0.60 \leq x \leq 0.75$, and cubic+hexagonal $Ti_{1-y}Al_yN$ sub-layers, $0.60 \leq y \leq 0.75$. The average cubic $Ti_{1-x}Al_xN$ sub-layer thickness is from 75 to 450 nm and the average cubic+hexagonal $Ti_{1-y}Al_yN$ sub-layer thickness is from 50 to 300 nm. The number of each of the cubic $Ti_{1-x}Al_xN$ sub-layers and cubic+hexagonal $Ti_{1-y}Al_yN$ sub-layers is from 2 to 50.

12 Claims, 6 Drawing Sheets

(51) Int. Cl.
*C23C 14/16* (2006.01)
*C23C 14/32* (2006.01)
*C23C 28/04* (2006.01)

(52) U.S. Cl.
CPC .......... *C23C 14/325* (2013.01); *C23C 28/044* (2013.01); *B23B 2224/24* (2013.01)

(56) References Cited

FOREIGN PATENT DOCUMENTS

| | | | |
|---|---|---|---|
| JP | 2015066644 | A | 4/2015 |
| JP | 2015104757 | A | 6/2015 |
| JP | 2016175161 | A | 10/2016 |
| WO | 2013002385 | A1 | 1/2013 |

\* cited by examiner

COATED CUTTING TOOL

The present invention relates to a coated cutting tool comprising a multilayer of cubic and hexagonal sub-layers of (Ti,Al)N.

RELATED APPLICATION DATA

This application is a § 371 National Stage Application of PCT International Application No. PCT/EP2020/066791 filed Jun. 17, 2020 claiming priority to EP 19181101.7 filed Jun. 19, 2019.

INTRODUCTION (Ti,Al)N coatings made by physical vapour deposition (PVD) are commonly used in the area of cutting tools for metal machining.

The crystal structure of (Ti,Al)N in PVD coatings can be cubic (NaCl (=B1)) structure or hexagonal (wurzite) structure. In prior art studies generally a lower Al content, such as <60% of Al+Ti, in (Ti,Al)N gives a cubic structure and a high Al content, such as >70%, gives a hexagonal structure. The specific limit of the level of Al content for giving either a single phase cubic structure or a mixed structure comprising both cubic and hexagonal structure have been reported and vary to some extent depending on, for example, the deposition conditions.

For example, Tanaka et al., "Properties of (Ti1−xAlx)N coatings for cutting tools prepared by the cathodic arc ion plating method", Journal of Vacuum Science & Technology A 10, 1749 (1992), reports (Ti1−xAlx)N films being single phase with a cubic B1 structure up to x=0.6 while a further increase in the aluminium content gave a wurtzite structure for x=0.85. Furthermore, Kimura et al., "Effects of Al content on hardness, lattice parameter and microstructure of (Ti1−xAlx)N films", Surface and Coatings Technology 120-121 (1999) 438-441, reports (Ti1−xAlx)N films synthesized by the arc ion plating method where the NaCl structure for x≤0.6 changed into wurtzite structure for x≥0.7.

Flank wear obviously takes place on the flanks of the cutting edge, mainly from an abrasive wear mechanism. The flanks are subjected to workpiece movement and too much flank wear will lead to poor surface texture of the workpiece, inaccuracy in the cutting process and increased friction as the cutting proceeds.

There is a continuing demand for coated cutting tools in which the coating has excellent properties in terms of flank wear resistance in order to provide a cutting tool with superior properties than currently available cutting tools on the market. If a better flank wear resistance is provided longer tool life is provided for certain metal machining applications. Thus, it is an object of the present invention to provide a coated cutting tool with excellent flank wear resistance.

THE INVENTION

It has now been provided a coated cutting tool for metal machining having a coating comprising a multilayer of alternating sub-layers of cubic (Ti,Al)N and mixed phase cubic and hexagonal (Ti,Al)N showing surprisingly good flank wear resistance without loosing performance in resistance to crater wear in metal cutting operations.

There has further been provided a coated cutting tool having a coating comprising a multilayer of alternating sub-layers of cubic (Ti,Al)N and mixed phase cubic and hexagonal (cubic+hexagonal) (Ti,Al)N wherein the Ti to Al ratio in the cubic phase sub-layer and cubic+hexagonal sub-layers, respectively, if desired can be held very close, or being substantially the same. In the latter case, the same targets can be used for depositing both the cubic and the cubic+hexagonal sub-layer which is an advantage for cost reasons and production efficiency.

The present invention relates to a coated cutting tool for metal machining comprising a substrate and a coating, wherein the coating comprises a (Ti,Al)N multilayer of alternating cubic $Ti_{1-x}Al_xN$ sub-layers, 0.60≤x≤0.75, and cubic+hexagonal $Ti_{1-y}Al_yN$ sub-layers, 0.60≤y≤0.75, the average cubic $Ti_{1-x}Al_xN$ sub-layer thickness is from 75 to 450 nm and the average cubic+hexagonal $Ti_{1-y}Al_yN$ sub-layer thickness is from 50 to 300 nm, the number each of cubic $Ti_{1-x}Al_xN$ sub-layers and cubic+hexagonal $Ti_{1-y}Al_yN$ sub-layers is from 2 to 50.

The average cubic $Ti_{1-x}Al_xN$ sub-layer thickness is suitably from 100 to 400 nm, preferably from 150 to 400 nm, more preferably from 150 to 350 nm, most preferably from 200-350 nm.

The average cubic+hexagonal $Ti_{1-y}Al_yN$ sub-layer thickness is suitably from 70 to 250 nm, preferably from 90 to 200 nm.

The thickness ratio of the cubic $Ti_{1-x}Al_xN$ sub-layer to the cubic+hexagonal $Ti_{1-y}Al_yN$ sub-layer is suitably from 5:1 to 1:1, preferably from 4:1 to 1.5:1.

For the cubic $Ti_{1-x}Al_xN$ sub-layer suitably 0.64≤x≤0.70, preferably 0.66-0.68.

For the cubic+hexagonal $Ti_{1-y}Al_yN$ sub-layer suitably 0.64≤y≤0.70, preferably 0.66-0.68.

The number each of cubic $Ti_{1-x}Al_xN$ sub-layers and cubic+hexagonal $Ti_{1-y}Al_yN$ sub-layers is suitably from 3 to 40, preferably from 4 to 20, most preferably from 5 to 15.

In one embodiment the difference between x in the cubic $Ti_{1-x}Al_xN$ sub-layer and y in the cubic+hexagonal $Ti_{1-y}Al_yN$ sub-layer is less than 0.09, or less than or equal to 0.05, or less than or equal to 0.03.

In one embodiment x substantially equals y.

The total thickness of the (Ti,Al)N multilayer is from 0.5 to 10 μm, or from 1 to 8 μm, or from 2 to 6 μm.

In 2theta XRD of the whole (Ti,Al)N multilayer the ratio between the peak area intensity of the hexagonal (0 0-1 0) reflection and the peak area intensity of the cubic (200) reflection, I(0 0-1 0)/I(200), is from 0.05 to 0.75, preferably from 0.08 to 0.35.

The cubic $Ti_{1-x}Al_xN$ sub-layer and the cubic+hexagonal $Ti_{1-y}Al_yN$ sub-layer are suitably PVD layers, preferably cathodic arc evaporation deposited layers.

In one embodiment the coating comprises one or more further layers of a metal nitride(s) below the (Ti,Al)N multilayer. The metal nitride(s) are suitably a nitride/nitrides of one or more metals belonging to group 4 to 6 in the IUPAC periodic table of elements, optionally together with Al and/or Si. Examples of such metal nitride(s) are TiN and (Ti,Al)N. The total thickness of these one or more metal nitride(s) layers can be from about 0.1 to about 2 μm, or from about 0.2 to about 1 μm.

The substrate of the coated cutting tool can be selected from the group of cemented carbide, cermet, ceramic, cubic boron nitride and high speed steel.

The coated cutting tool can be a cutting tool insert, a drill, or a solid end-mill, for metal machining. The cutting tool insert is suitably a milling, drilling or turning insert.

By "cubic" in the term "cubic sub-layer" is herein meant that there are no point-shaped diffraction spots from any hexagonal crystallographic planes to be seen in electron diffraction analysis and/or there are no hexagonal peak seen in XRD theta-2theta analysis.

EXAMPLES

Example 1

Different coatings of $Ti_{0.33}Al_{0.67}N$, both according to the present invention and outside the present invention, were deposited on sintered cemented carbide cutting tool insert blanks of the geometry CNMG120804-MM. The composition of the cemented carbide was 10 wt % Co, 0.4 wt % Cr and rest WC. The cemented carbide blanks were coated by cathodic arc evaporation in a vacuum chamber comprising four arc flanges. Targets of Ti—Al were mounted in all of the flanges.

The uncoated blanks were mounted on pins that undergo a three-fold rotation in the PVD chamber.

For making a cubic $Ti_{0.33}Al_{0.67}N$ layer the chamber was pumped down to high vacuum (less than $10^{-2}$ Pa) and heated to about 450° C. by heaters located inside the chamber. If the layer was to be deposited as a first layer on the substrate then the blanks were etched for 60 minutes in an Ar plasma. The chamber pressure (reaction pressure) was set to 10 Pa of $N_2$ gas, and a unipolar DC bias voltage of −300 V (relative to the chamber walls) was applied to the blank assembly. The cathodes were run in an arc discharge mode at a current of 150 A (each).

For making a cubic+hexagonal $Ti_{0.33}Al_{0.67}N$ layer the chamber was pumped down to high vacuum (less than $10^{-2}$ Pa) and heated to about 450° C. by heaters located inside the chamber. If the layer was to be deposited as a first layer on the substrate then the blanks were etched for 60 minutes in an Ar plasma. The chamber pressure (reaction pressure) was set to 4 Pa of $N_2$ gas, and a unipolar pulsed bias voltage of −50V (relative to the chamber walls) at a pulsed bias frequency of 2 kHz and a duty cycle of 10% was applied to the blank assembly. The cathodes were run in an arc discharge mode at a current of 150 A (each).

Layers of 3 μm total thickness were deposited.

The samples made, single layers and combinations of layers, are seen in Table 1. The sub-layer thicknesses are average values.

TABLE 1

| Sample No. | Coating | total thickness (μm) | No. of cubic sub-layers | No. of cubic + hexagonal sub-layers | Comment |
|---|---|---|---|---|---|
| 1 | 3 μm cubic $Ti_{0.33}Al_{0.67}N$ | 3 | | | comparative |
| 2 | 3 μm multilayer: 500 nm cubic $Ti_{0.33}Al_{0.67}N$ + 250 nm cubic + hexagonal $Ti_{0.33}Al_{0.67}N$ | 3 | 4 | 4 | comparative |
| 3 | 3 μm multilayer: 300 nm cubic $Ti_{0.33}Al_{0.67}N$ + 150 nm cubic + hexagonal $Ti_{0.33}Al_{0.67}N$ | 3 | 6-7 | 6-7 | invention |
| 4 | 3 μm multilayer: 200 nm cubic $Ti_{0.33}Al_{0.67}N$ + 100 nm cubic + hexagonal $Ti_{0.33}Al_{0.67}N$ | 3 | 10 | 10 | invention |
| 5 | 3 μm multilayer: 30 nm cubic $Ti_{0.33}Al_{0.67}N$ + 15 nm cubic + hexagonal $Ti_{0.33}Al_{0.67}N$ | 3 | 60-65 | 60-65 | comparative |

Figure 1:
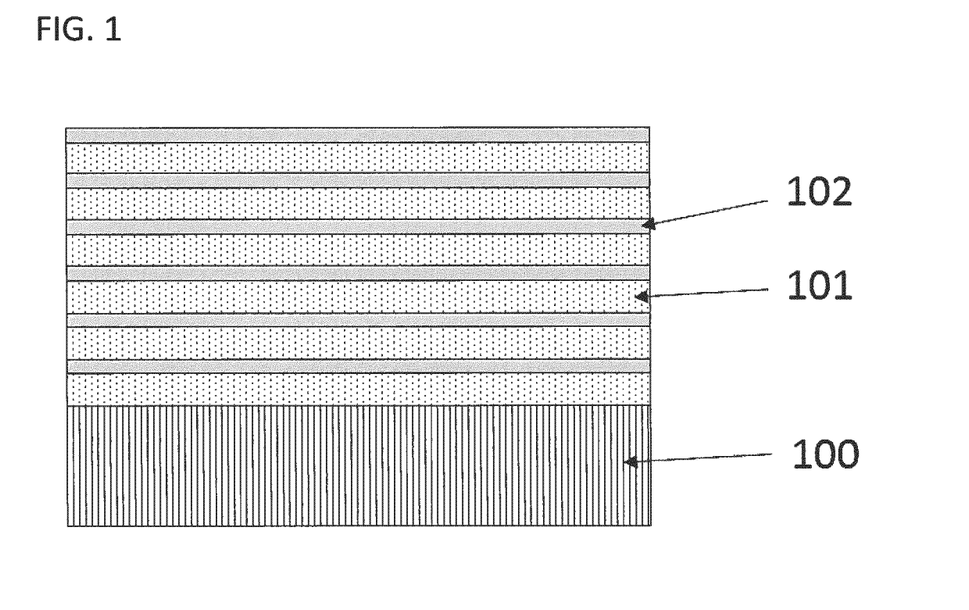
FIG. 1 shows a schematic illustration of a substrate with a coating according to one embodiment of the invention.
Figure 2:
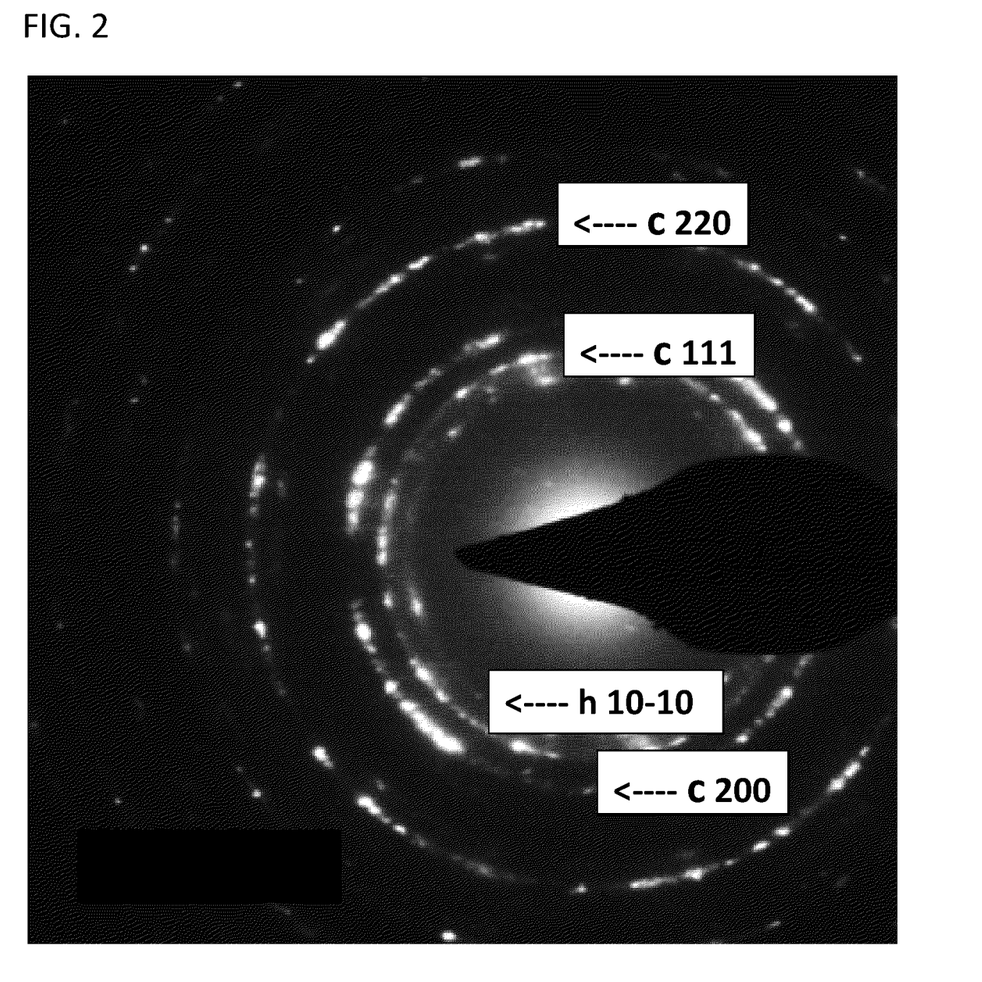
FIG. 2 shows an electron diffraction pattern of the cubic+hexagonal sub-layer.
Figure 3:
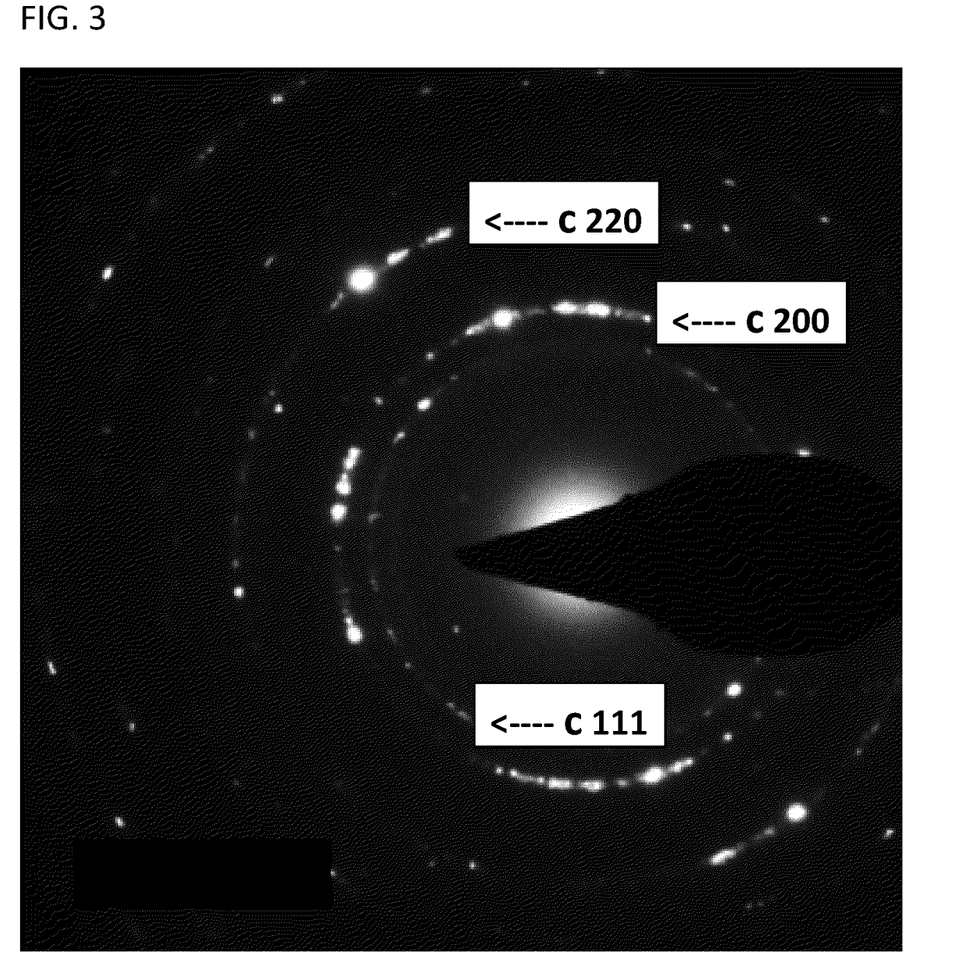
FIG. 3 shows an electron diffraction pattern of the cubic sub-layer.

Selected area electron diffraction (SAED) analysis by transmission electron microscopy (TEM) was performed on sample 4. FIG. 2 shows the diffraction image of the cubic+hexagonal sub-layer and FIG. 3 shows the diffraction image of the cubic sub-layer.

300 kV FEG TEM was used, beam in parallel illumination mode, using a selected area aperture which had a projected size of approximately 150 nm in the objective plane (i.e., a size directly comparable to features in the sample).

The sample was a cross-section sample produced by focused Ion Beam lift-out and polishing using Ga+ ions.

FIG. 2 shows the results from the first type of sub-layer where clear point-shaped diffraction spots from cubic the crystallographic planes (2 2 0), (2 0 0) and (1 1 1) are seen together with clear point-shaped diffraction spots from the hexagonal crystallographic plane (1 0-1 0). Thus, the layer is a mixed cubic+hexagonal layer.

FIG. 3 shows the results from the second type of sub-layer where clear point-shaped diffraction spots from the cubic crystallographic planes (2 2 0), (2 0 0) and (1 1 1) are seen also here. However, there are no point-shaped diffraction spots from any hexagonal crystallographic planes. It is only seen a weak fuzzy ring-shaped reflection from the (1 0-1 0) plane. Thus, the layer contains no substantial crystalline hexagonal phase and is considered to be a single phase cubic layer.

As a further investigation XRD analysis was made on the cubic and cubic+hexagonal layers. Since XRD on a specific sub-layer present as part of a multilayered structure is difficult to make XRD measurement was made on Sample 1 being a cubic monolayer and a further sample was made according to the process parameters used for making the cubic+hexagonal sub-layer.

The X-ray diffraction (XRD) analysis was conducted on the flank face of the coated inserts using a PANalytical CubiX3 diffractometer equipped with a PIXcel detector. The coated cutting tool inserts were mounted in sample holders that ensure that the flank face of the samples were parallel to the reference surface of the sample holder and also that the flank face was at appropriate height. Cu—K$_a$ radiation was used for the measurements, with a voltage of 45 kV and a current of 40 mA. Anti-scatter slit of ½ degree and divergence slit of ¼ degree were used. The diffracted intensity from the coated cutting tool was measured around 2θ angles where relevant peaks occur.

Figure 4:
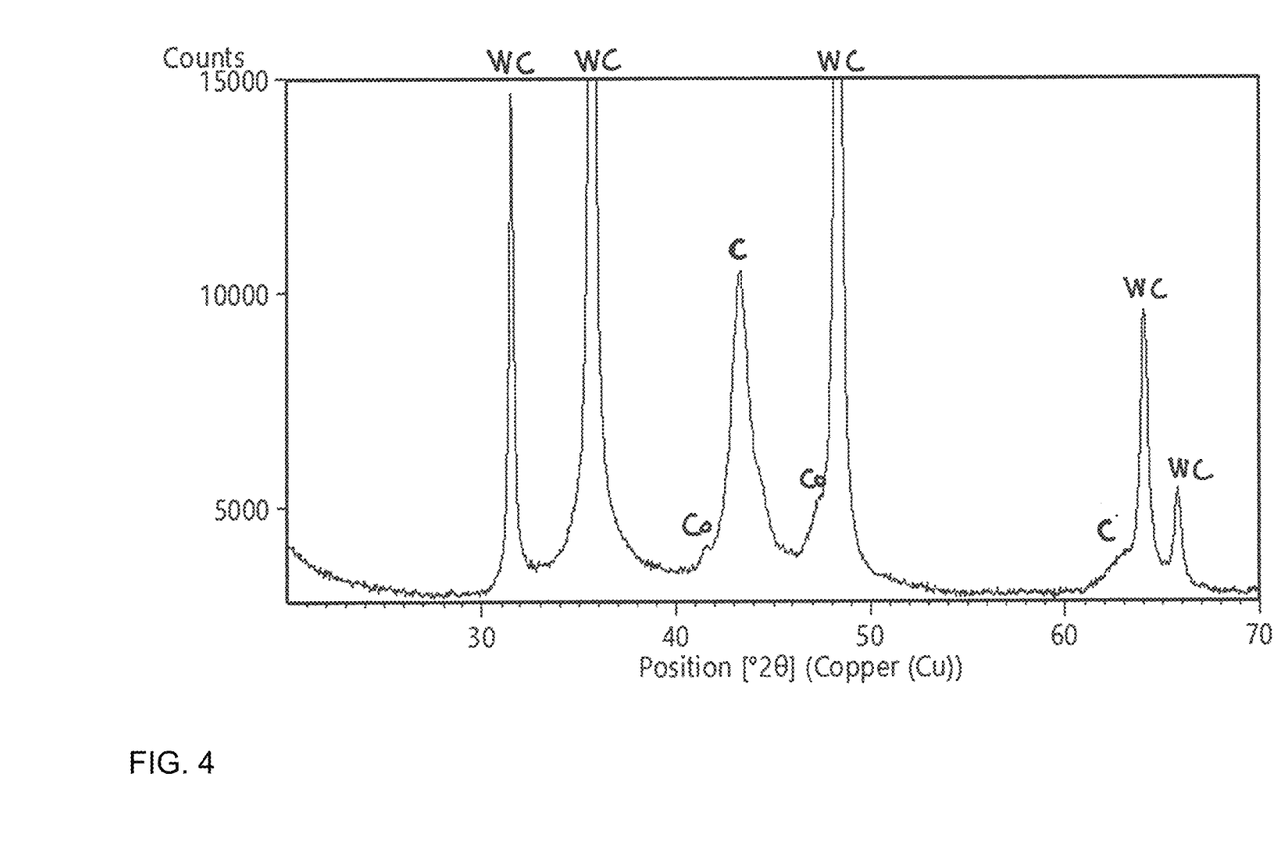
FIG. 4 shows an X-ray diffractogram of a cubic layer.
Figure 5:
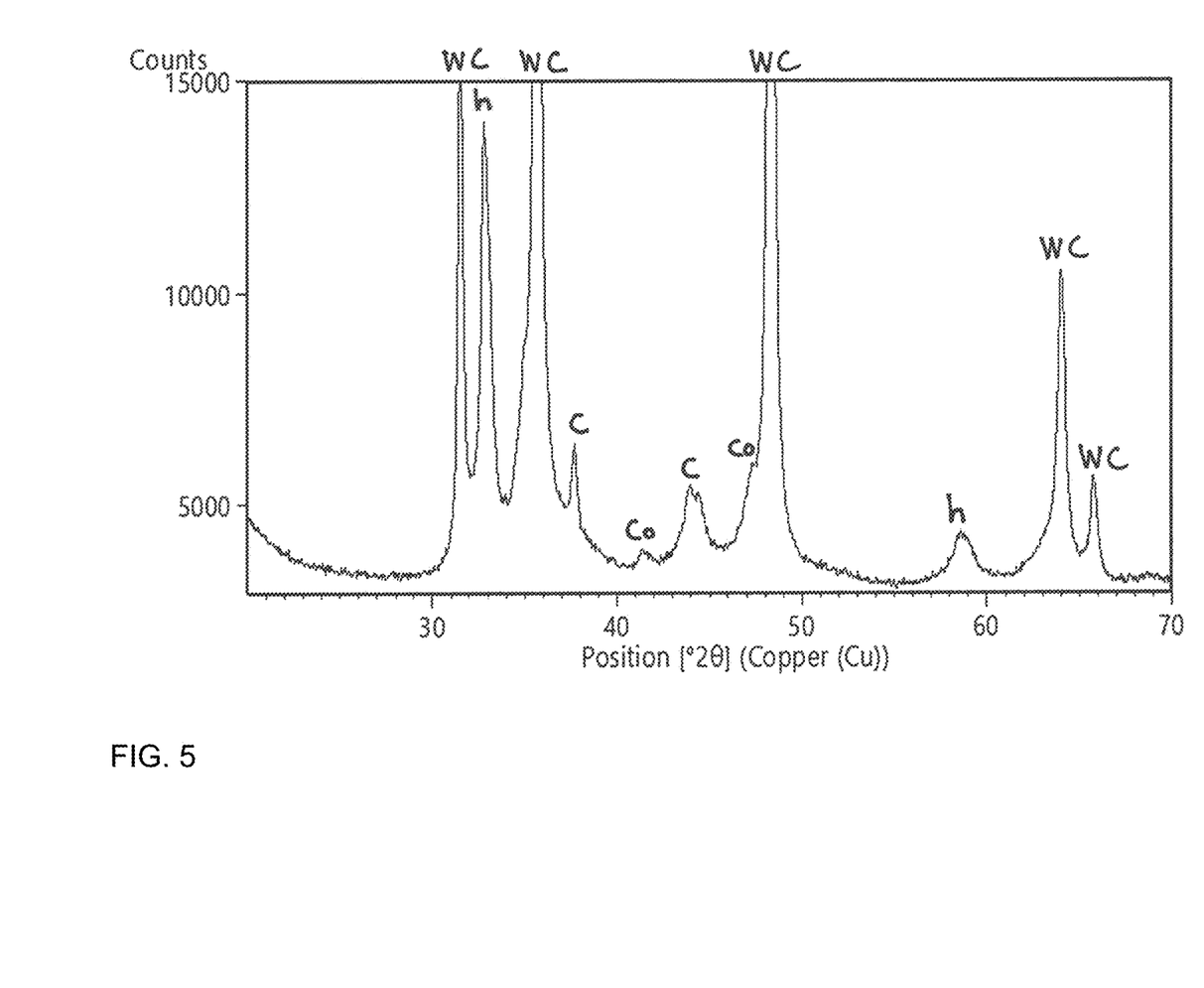
FIG. 5 shows an X-ray diffractogram of a cubic+hexagonal layer.

FIGS. 4 and 5 show the diffractograms. FIG. 4 shows a diffractogram of Sample 1 with no signs of any hexagonal (h) peaks. FIG. 5 shows a diffractogram from the other type of layer containing both cubic (c) and hexagonal (h) peaks.

Thus, also the XRD analysis concludes that the cubic layer present can indeed be considered to be a single phase cubic layer.

XRD analysis was further made on the whole (Ti,Al)N multilayer. Sample 4 was used. The same XRD analysis method as described above was used.

Figure 6:
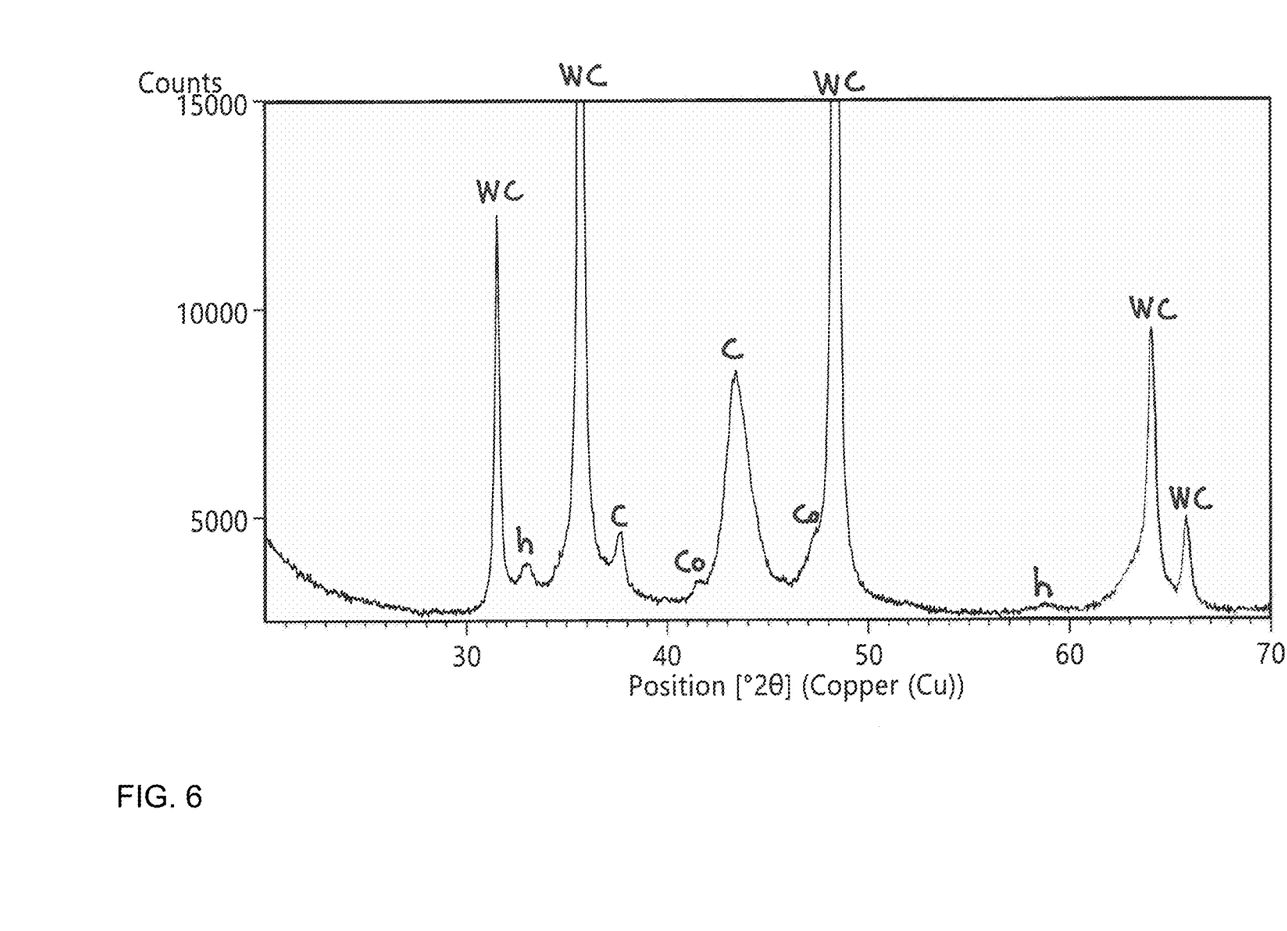
FIG. 6 shows an X-ray diffractogram of the (Ti,Al)N multilayer.

FIG. 6 shows the diffractogram. Table 2 below shows the values of peak intensities:

TABLE 2

| Peak | Area intensity |
| --- | --- |
| I(200) | 7234 |
| I(10-10) | 797 |

The ratio I(1 0-1 0)/I(2 0 0) was thus 0.11.

Explanations to Terms Used in Examples 2-3

The following expressions/terms are commonly used in metal cutting, but nevertheless explained in the table below:

$V_c$ (m/min): cutting speed in meters per minute
$f_n$ (mm/rev) feed rate per revolution (in turning)
$a_p$ (mm): axial depth of cut in millimeter Inserts from Example 1 were tested for flank wear and crater wear.

Example 2

Flank Wear Test:
Longitudinal turning
Work piece material: Uddeholm Sverker 21 (tool steel), Hardness~210HB, D=180,
L=700 mm,
$V_c$=125 m/min
$f_n$=0.072 mm/rev
$a_p$=2 mm
without cutting fluid
The cut-off criteria for tool life is a flank wear VB of 0.15 mm.

Example 3

Crater Wear Test:
Longitudinal turning
Work piece material: Ovako 825B, ball bearing steel. Hot rolled and annealed,
Hardness ~200HB, D=160, L=700 mm,
$V_c$=160 m/min
$f_n$=0.3 mm/rev
$a_p$=2 mm
with cutting fluid
The criteria for end of tool life is a crater area of 0.8 mm$^2$.

The results from the testings according to Examples 2-3 are seen in Table 3 below.

TABLE 3

| Sample No. | Coating | Comment | Flank wear Tool life (min) | Crater wear Tool life (min) |
| --- | --- | --- | --- | --- |
| 1 | 3 μm cubic Ti$_{0.33}$Al$_{0.67}$N | comparative | 9.5 | 8.0 |
| 2 | 3 μm multilayer: 500 nm cubic + 250 nm cubic + hexagonal | comparative | 15.4 | 6.8 |
| 3 | 3 μm multilayer: 300 nm cubic + 150 nm cubic + hexagonal | invention | 20.8 | 7.1 |
| 4 | 3 μm multilayer: 200 nm cubic + 100 nm cubic + hexagonal | invention | 21.1 | 7.5 |
| 5 | 3 μm multilayer: 30 nm cubic + 15 nm cubic + hexagonal | comparative | 8.3 | 6.0 |

It is concluded that the samples according to the invention (No. 3 and No. 4) have exceptional flank wear resistance while their crater wear resistance remains at about the same level as for a single layer cubic (Ti,Al)N layer.

The invention claimed is:

1. A coated cutting tool for metal machining comprising a substrate and a coating, wherein the coating includes a (Ti,Al) N multilayer of alternating cubic Ti$_{1-x}$Al$_x$N sub-layers, 0.60≤x≤0.75, and cubic+hexagonal Ti$_{1-y}$Al$_y$N sub-layers, 0.60≤y≤0.75, an average cubic Ti$_{1-x}$Al$_x$N sub-layer thickness being from 75 to 450 nm and an average cubic+hexagonal Ti$_{1-y}$Al$_y$N sub-layer thickness being from 70 to 300 nm, a number each of cubic Ti$_{1-x}$Al$_x$N sub-layers and cubic+hexagonal Ti$_{1-y}$Al$_y$N sub-layers being from 2 to 50.

2. The coated cutting tool according to claim 1, wherein the average cubic Ti$_{1-x}$Al$_x$N sub-layer thickness is from 150 to 400 nm.

3. The coated cutting tool according to claim 1, wherein the average cubic+hexagonal Ti$_{1-y}$Al$_y$N sub-layer thickness is from 70 to 250 nm.

4. The coated cutting tool according to claim 1, wherein a thickness ratio of the cubic Ti$_{1-x}$Al$_x$N sub-layer to the cubic+hexagonal Ti$_{1-y}$Al$_y$N sub-layer is from 5:1 to 1:1.

5. The coated cutting tool according to claim 1, wherein for the cubic Ti$_{1-x}$Al$_x$N sub-layer, 0.64≤x≤0.70.

6. The coated cutting tool according to claim 1, wherein for the cubic+hexagonal Ti$_{1-y}$Al$_y$N sub-layer, 0.64≤y≤0.70.

7. The coated cutting tool according to claim 1, wherein the number each of cubic Ti$_{1-x}$Al$_x$N sub-layers and cubic+hexagonal Ti$_{1-y}$Al$_y$N sub-layers is from 3 to 40.

8. The coated cutting tool according to claim 1, wherein the difference between x in the cubic Ti$_{1-x}$Al$_x$N sub-layer and y in the cubic+hexagonal Ti$_{1-y}$Al$_y$N sub-layer is less than 0.09.

9. The coated cutting tool according to claim 1, wherein x equals y.

10. The coated cutting tool according to claim 1, wherein a total thickness of the (Ti,Al) N multilayer is from 0.5 to 10 μm.

11. The coated cutting tool according to claim 1, wherein in 2theta XRD of a whole (Ti,Al) N multilayer I(0 0-1 0)/I(2 0 0), is from 0.05 to 0.75.

12. The coated cutting tool according to claim 1, wherein the cubic $Ti_{1-x}Al_xN$ sub-layer and the cubic+hexagonal $Ti_{1-y}Al_yN$ sub-layer are cathodic arc evaporation deposited layers.

\* \* \* \* \*